US007742743B2

(12) United States Patent
Kanda

(10) Patent No.: US 7,742,743 B2
(45) Date of Patent: Jun. 22, 2010

(54) REDUCED FRAME COLLISION WIRELESS COMMUNICATION SYSTEM HAVING COMMUNICATION DEVICE MODE SWITCHING

(75) Inventor: Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 11/463,200

(22) Filed: Aug. 8, 2006

(65) Prior Publication Data

US 2007/0060140 A1 Mar. 15, 2007

(30) Foreign Application Priority Data

Aug. 12, 2005 (JP) ............... 2005-234696

(51) Int. Cl.
*H04B 7/00* (2006.01)
(52) U.S. Cl. ............... 455/41.2; 455/11.1; 455/412.2; 370/338; 370/386; 370/225
(58) Field of Classification Search ............... 370/312, 370/458, 341, 447, 462, 327, 310, 328–338; 455/11.1, 412.2, 435, 509, 510, 511, 520, 455/552, 561, 446, 449, 412.1, 445
See application file for complete search history.

(56) References Cited

U.S. PATENT DOCUMENTS

| 4,539,706 | A | * | 9/1985 | Mears et al. ............... 455/11.1 |
| 6,014,406 | A | * | 1/2000 | Shida et al. ............... 375/133 |
| 6,055,411 | A | * | 4/2000 | Ishida et al. ............... 455/11.1 |
| 6,141,533 | A | * | 10/2000 | Wilson et al. ............... 455/11.1 |
| 6,888,811 | B2 | * | 5/2005 | Eaton et al. ............... 370/338 |
| 2002/0015397 | A1 | * | 2/2002 | Hughes et al. ............... 370/338 |
| 2002/0044549 | A1 | * | 4/2002 | Johansson et al. ............... 370/386 |
| 2002/0077151 | A1 | * | 6/2002 | Matthews et al. ............... 455/561 |
| 2002/0110141 | A1 | * | 8/2002 | Perkins et al. ............... 370/445 |
| 2003/0058808 | A1 | * | 3/2003 | Eaton et al. ............... 370/310 |
| 2003/0092452 | A1 | * | 5/2003 | Youngs et al. ............... 455/461 |
| 2003/0099221 | A1 | * | 5/2003 | Rhee ............... 370/338 |
| 2003/0235175 | A1 | * | 12/2003 | Naghian et al. ............... 370/338 |
| 2004/0266340 | A1 | * | 12/2004 | Ivanov et al. ............... 455/11.1 |
| 2005/0208928 | A1 | * | 9/2005 | Avery et al. ............... 455/412.2 |
| 2006/0285579 | A1 | * | 12/2006 | Rhee et al. ............... 375/132 |

FOREIGN PATENT DOCUMENTS

| JP | 2000-288813 | 10/2000 |
| JP | 2004-146883 | 5/2004 |

* cited by examiner

*Primary Examiner*—Nick Corsaro
*Assistant Examiner*—Chuong A Ngo
(74) *Attorney, Agent, or Firm*—Cowan, Liebowitz & Latman, P.C.

(57) ABSTRACT

A communication system makes throughput preferable by reducing wireless frame collision which occurs when a plurality of control stations cannot recognize one another. When a wireless communication device that is operating as a dependent station of a first control station detects a second control station, DEVice operates as a dependent control station. Accordingly, the second control station is changed to a dependent station or a dependent control station.

5 Claims, 18 Drawing Sheets

F I G. 18
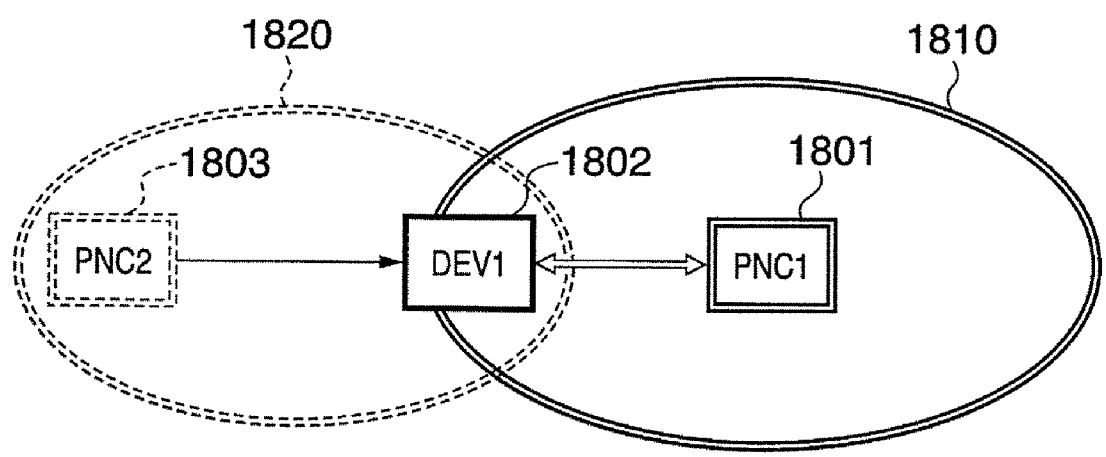

REDUCED FRAME COLLISION WIRELESS COMMUNICATION SYSTEM HAVING COMMUNICATION DEVICE MODE SWITCHING

BACKGROUND OF THE INVENTION

1. Field of the Invention

This invention relates to a control technique of a communication network.

2. Description of the Related Art

Various wireless communication systems are under developing and are gradually going to become common. For example, as a relatively short-ranged wireless communication system, a wireless LAN (Local Area Network) system is generally widespread.

On the other hand, as a more short-ranged (e.g., 10 m or less) wireless communication system, a WPAN (Wireless Personal Area Network) system is being developed. That can connect consumer apparatus (e.g., computer peripheral apparatus, digital camera, digital video camera or the like) with a printer or a cellular phone.

At present, for the WPAN, a standard is being drawn as a group of IEEE802.15 standards. Specifications for a network topology configuration or a media access protocol are defined in IEEE802.15.3 standard.

Compared with a wireless LAN, the WPAN may be characterized in that each of wireless communication devices dynamically (autonomously) forms a network according to surrounding circumstances or an executing condition of an application. For example, in an infrastructure mode of the wireless LAN, a predetermined wireless communication device called an access point controls each terminal device. To the contrary, in a wireless network in the WPAN (hereinafter called a piconet), a control station called a PNC (Piconet Coordinator) controls a media access of each terminal device (child station), but a predetermined wireless communication device does not necessarily become a PNC. The WPAN wireless communication device is classified as a device with a PNC function and a device without a PNC function. Any device with a PNC function actually generates a piconet and controls it as a PNC.

FIG. 14 is a sequence diagram representing a procedure of generating a piconet in the WPAN. Each of DEV1 and DEV2 in the figure is a WPAN wireless communication device with a PNC function. DEV1 which is powered on (S1401) scans available frequency channels in order (S1402). That is for determining whether a WPAN piconet has been present or not. A PNC of a piconet periodically transmits a beacon frame. Thus, if DEV1 can detect the beacon frame, it can determine that a piconet is present. If a piconet is present, DEV1 will participate in the piconet.

If a piconet is not present at this moment, DEV1 with a PNC function determines that it needs to be a PNC. DEV1 selects an optimum channel from available frequency channels (S1403). Then, DEV1 generates a new piconet by starting periodic transmission of beacon frame in the selected channel (S1404).

When DEV2 is powered on next to DEV1 (S1411), DEV2 scans frequency channels for a certain time period in the same manner as DEV1 (S1412). DEV2 detects a operating piconet of DEV1 as DEV2 receives a beacon frame from DEV1 (S1413). DEV2 transmits a request for participation command to DEV1, which is a control station of a piconet (S1414). In response to the request for participation, DEV1 returns an admission of participation command to DEV2 (S1415). The admission of participation command includes a device identifier newly allocated to DEV2 by DEV1.

With operation above, one of a plurality of wireless communication devices autonomously becomes a control station and creates a WPAN piconet. Thereafter, when a new wireless communication device is powered on, it participates in a piconet in the same procedure as DEV2.

The TDMA (Time Division Multiple Access) system is adopted as a media access method in a WPAN. Generally, in the TDMA system, a terminal device which needs to reserve a data channel requests a control station to allocate a communication band in advance.

FIG. 15 is a diagram showing a principle of the TDMA system in a WPAN. The abscissa indicates time. A superframe 1501 starts with a beacon frame 1502 that is periodically transmitted by a PNC. Each superframe 1501 is divided into time slots 1503 each of which becomes an available time period to be used by each terminal device in wireless communication.

A communication band available for a terminal device is reserved as a time slot on a time axis like this. In each of time slots, only a terminal device which is designated as a transmitting terminal can transmit a wireless frame. A starting time of the time slot and the length of the time slot are indicated in a beacon frame from a control station. In such a time slot, a source device (Source) and a destination terminal device (Destination) are designated.

With the WPAN, a child station (dependent station) participating in a piconet can hierarchically generate a dependent piconet. In such a case, the wireless communication device that generated the dependent piconet behaves as a control station in the dependent piconet. On the other hand, said wireless communication device operates as a child station in a parent piconet. Such a wireless communication device is called a dependent control station or a dependent PNC. As the parent piconet and the dependent piconet are synchronized with each other, wireless frames that are transmitted by different devices never collide with each other in theory.

On the other hand, a plurality of piconets which are independent of each other operate asynchronously in time. Therefore, a wireless signal asynchronously arrives from each piconet at a region in which communication cover-areas of the piconets overlap one another. Accordingly, collision of wireless frames may occur. In an access protocol by the TDMA, such a frame collision degrades data transfer throughput.

As mentioned above, operation of a parent piconet and operation of a dependent piconet are synchronized with each other so that such degradation of throughput can be avoided.

FIG. 16 is a diagram showing a configuration of a parent piconet and a dependent piconet. In FIG. 16, PNC1 is a control station of a parent piconet 1601 and contains a plurality of wireless communication devices. Although DEV2 among the plurality of wireless communication devices becomes a child station in a parent piconet, it has a role of PNC2 as it operates as a control station in a dependent piconet 1602.

FIG. 17 is a diagram showing operation timing for a parent piconet and a dependent piconet. In FIG. 17, a superframe of the parent piconet 1601 is managed by beacon frame 1502 which is periodically transmitted from PNC1. If a time slot which can be used by the dependent piconet 1602 is allocated in the superframe, PNC2, which is a dependent PNC at a starting point of the time slot, transmits beacon frame 1702. A child station in the dependent piconet 1602 operates being synchronized with the beacon frame 1702. Therefore, a wireless frame of the parent piconet 1601 and a wireless frame of the dependent piconet 1602 never collide with each other.

Here, a time slot of the dependent piconet 1602 is indicated in the beacon frame 1502 of the parent piconet 1601. Each time slot in a superframe in the dependent piconet 1602 is indicated in the beacon frame 1702 of the dependent piconet 1602.

The Japanese Patent Application Laid-Open 2000-288813 proposes a technique in which a slave station that was not able to receive synchronized signals from a master station changes from a slave mode to a master mode.

The Japanese Patent Application Laid-Open 2004-146883 proposed a method for a plurality of control stations to receive beacon frames one another and avoid collision of wireless frames by adjusting lengths of superframes one another.

In order to further improve data throughput, a network topology needs to be optimized as much as possible.

When a wireless communication device dynamically and autonomously creates a piconet, it can use a function of generating a piconet and a dependent piconet function mentioned above. But no specific algorithm for constructing an optimum network topology by using the functions has been provided yet.

FIG. 18 is a diagram showing a network configuration that causes frame collision among piconets. In the figure, a first wireless communication device 1801 that is operating as a control station forms a first piconet 1810. The first piconet 1810 contains a second wireless communication device 1802 that is operating as a child station.

When a third wireless communication device 1803 is powered on near the first piconet 1810, it first detects whether a piconet is present or not in the vicinity. The third wireless communication device 1803 can receive a wireless frame transmitted from the second wireless communication device 1802. But as the third wireless communication device 1803 is placed at a distant from the first wireless communication device 1801, i.e., a control station of the first piconet 1810, it cannot receive a beacon frame transmitted from the first wireless communication device 1801.

In this case, as the third wireless communication device 1803 determines that it has no piconet to participate in the vicinity, it becomes a control station itself and generates an independent piconet 1820. As the first piconet 1810 and the independent piconet 1820 operate independently and asynchronously, at a place where cover areas of both of the piconets overlap (the place of the second wireless communication device 1802), frames transmitted from the two piconets may collide with each other. It is needless to say that data throughput is reduced, if frame collision occurs.

Briefly speaking, if a plurality of control stations which cannot recognize the others' presence are present, and if a child station which can communicate with the control stations is present, throughput may be reduced to the child station.

According to the Japanese Patent Application Laid-Open 2000-288813, as a plurality of master stations asynchronously transmit beacon frames in the same manner, the above-mentioned problem cannot be solved.

The Japanese Patent Application Laid-Open 2004-146883 assumes that control stations can communicate with one another, the above-mentioned problem cannot be solved either.

The present invention intends to solve at least one of such problems or the other problems. The other problems can be understood through the entire of the specification.

SUMMARY OF THE INVENTION

According to the present invention, when a communication device that is operating as a dependent station of a first control station detects a second control station, it operates as a dependent control station. Accordingly, the second control station is changed to a dependent station or a dependent control station.

According to the present invention, when another control station detected by a dependent station is changed to a dependent station or a dependent control station, a network with a preferred topology can be reconstructed. Accordingly, data throughput can also be improved.

Further features of the present invention will become apparent from the following description of exemplary embodiments (with reference to the attached drawings).

BRIEF DESCRIPTION OF THE DRAWINGS

FIG. 18 is a diagram showing a network configuration when frame collision occurs among piconets.

DESCRIPTION OF THE EMBODIMENTS

First Embodiment

Figure 1:
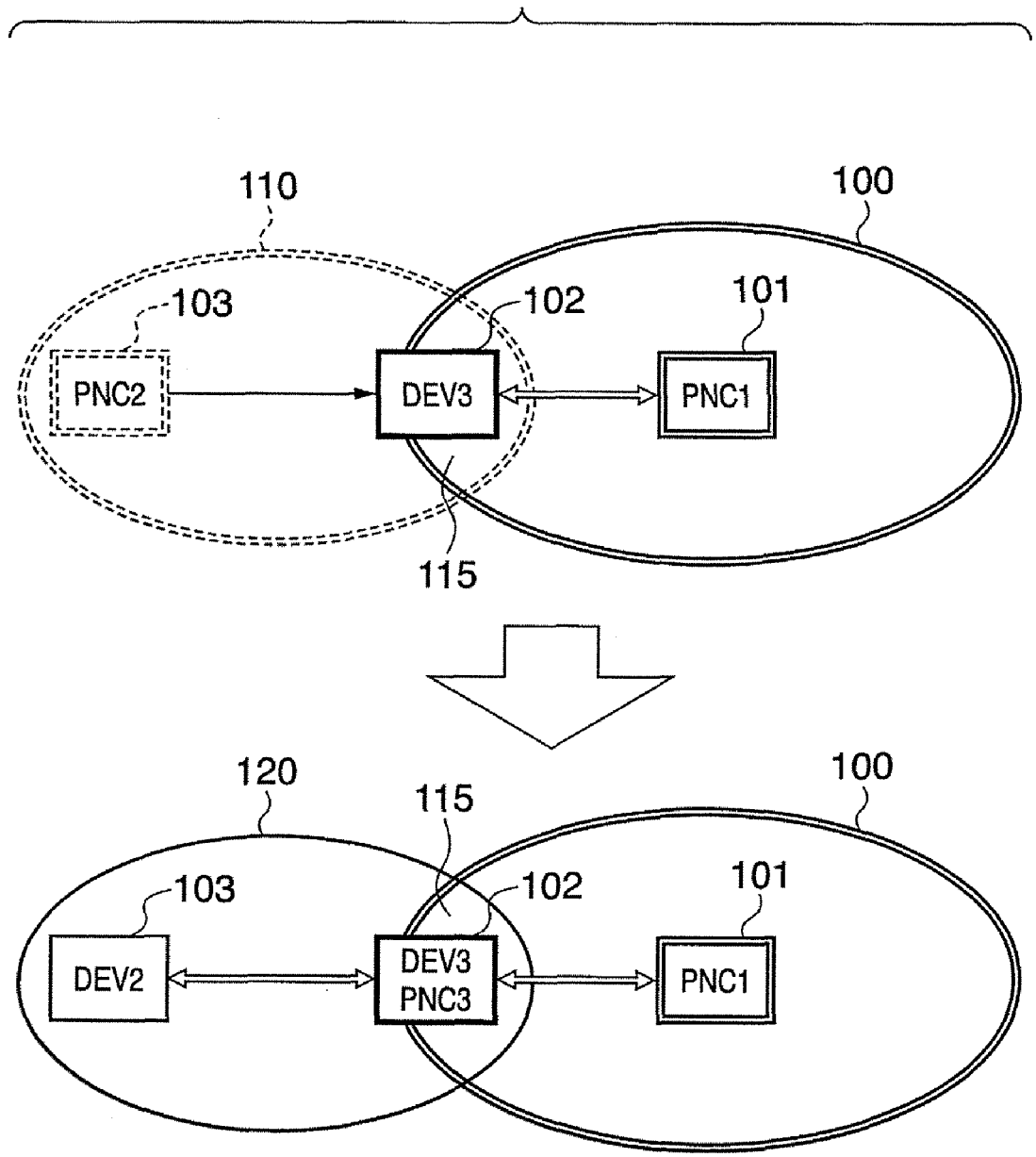
FIG. 1 is a diagram exemplifying a configuration of a piconet in an embodiment.

Embodiments according to the present invention will be described below with reference to drawings. FIG. 1 is a diagram exemplifying a configuration of a piconet in the present embodiment. The reference numerals 101, 102 and 103 denote wireless communication devices which can operate as a child station or a control station. The wireless communication device 101 is operating as an existing control station (PNC1). The existing control station (PNC1) forms an existing piconet 100.

The wireless communicating device 102 is operating as an existing child station (DEV3). The existing child station (DEV3) belongs to the existing piconet 100. The child station can also be called a dependent station or a slave station. The control station can be called a parent station or a master station.

It is assumed that another wireless communication device 103 is powered on near the existing piconet 100. If the wireless communication device 103 cannot receive a beacon frame transmitted from a control station (PNC1), it starts operation as a new control station (PNC2) and forms an independent piconet 110. At this point of time, asynchronously operating two piconets are present adjacently.

As it is apparent from the figure, in a cover area of a piconet 100 and a cover area in a piconet 110, an overlap area 115 is present. As wireless frames transmitted from both the piconet 100 and 110 arrive at the overlap area 115, collision of wireless frames occurs.

As it is apparent from the figure, the existing child station (DEV3) is positioned in this overlap area 115. Therefore, the wireless frame transmitted by another independent piconet 110 will interfere with the child station (DEV3) from communicating in the piconet 100.

As such, in a wireless communication system in which a wireless communication device autonomously creates a network, a plurality of wireless networks which asynchronously operates may be built adjacent to one anther. For example, that is like a case where predetermined control signals cannot be recognized among a plurality of control stations. In such a case, in an overlap area of a plurality of adjacent wireless networks, wireless frame collisions occur and throughput tends to be reduced.

Then, in the embodiment, the wireless communication device 102 operating as a child station is made a dependent control station (DEV3/PNC3) that operates following the control station (PNC1). That causes the wireless communication device 103 that is operating as a control station (PNC2) to change to a child station (DEV2).

Figure 17:
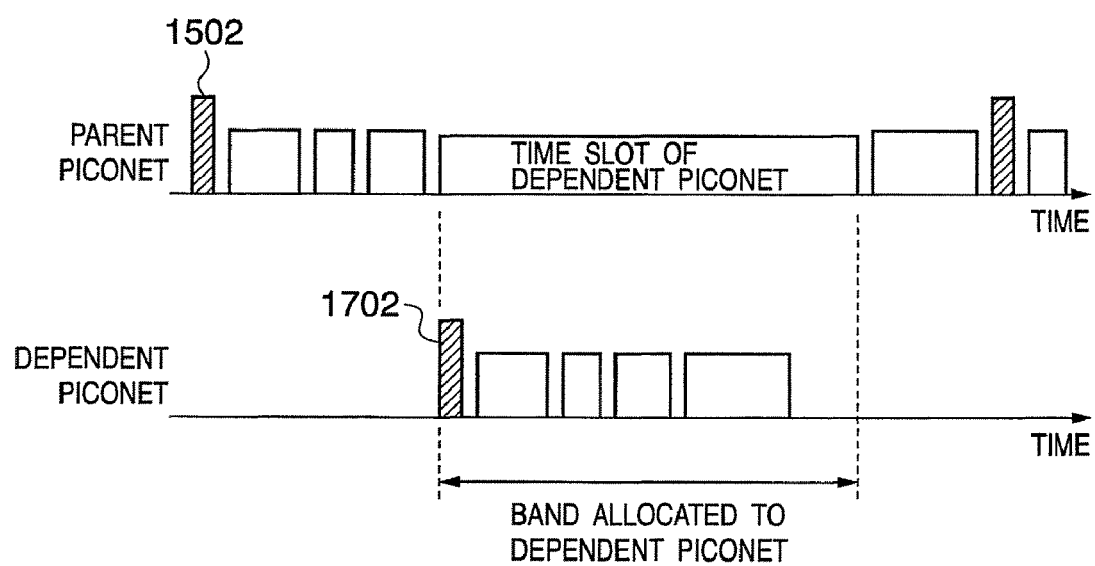
FIG. 17 is a diagram showing operation timing for a parent piconet and a dependent piconet.

The dependent control station (DEV3/PNC3) will form a new dependent piconet 120. It is needless to say that the dependent piconet 120 operates being synchronized with the existing piconet 100. Communication timing between the dependent piconet 120 and the existing piconet 100 is as described in FIG. 17, for example. As the wireless communication device 103 changes from the control station (PNC2) to the child station (DEV2), the independent piconet 110 stops operating. The wireless frame collision in the overlap area 115 may be theoretically avoided so that throughput is expected to be improved.

Figure 2:
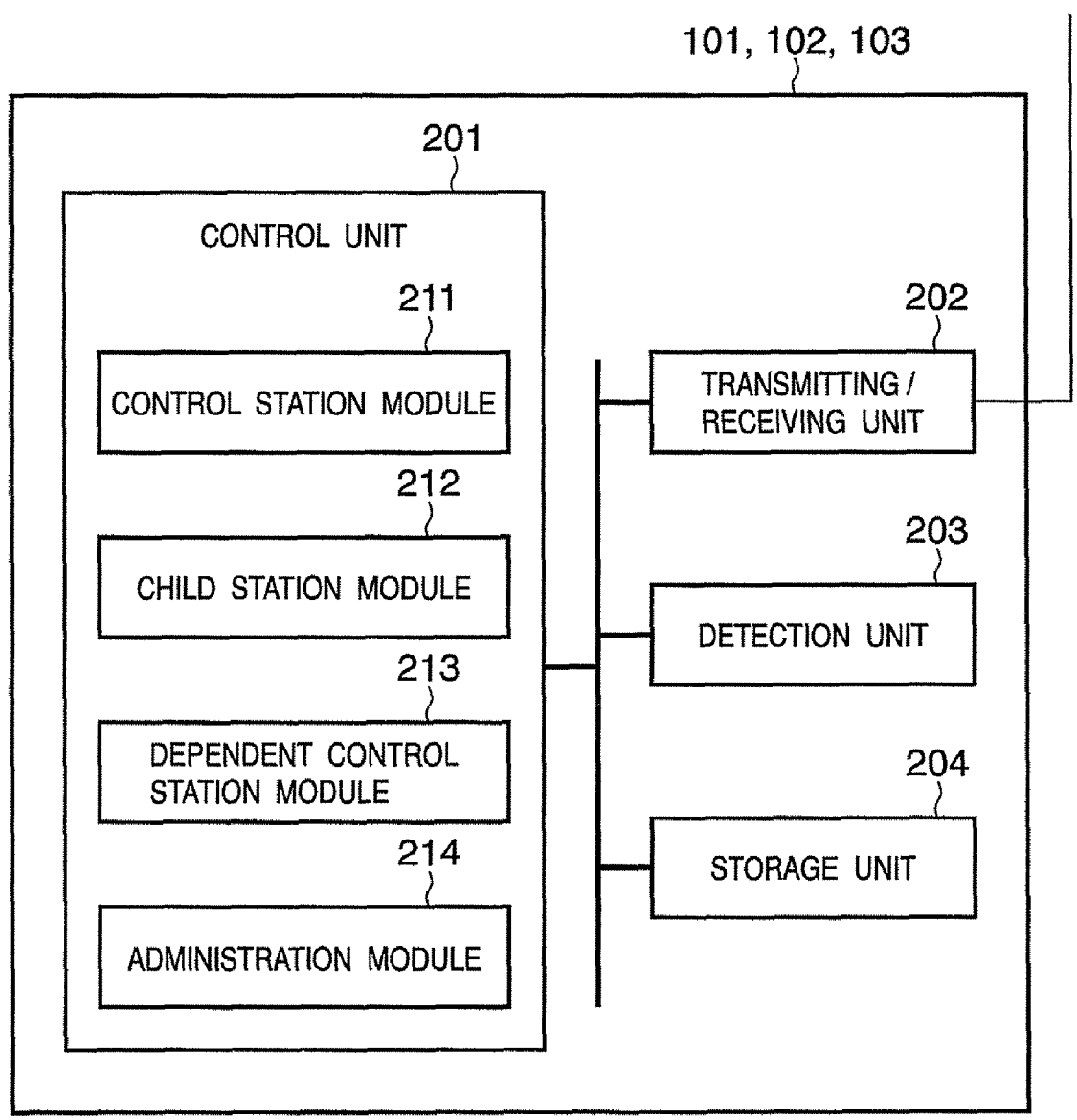
FIG. 2 is an exemplary block diagram of a wireless communication device in the embodiment.

FIG. 2 is an exemplary block diagram of a wireless communication device of the embodiment. A control unit 201 controls over respective units of a wireless communication device. Although the control unit 201 can be completely configured by logical circuits, it is generally realized by a CPU, a DSP and a control program. It is needless to say that the functions to be described below may be realized as a communication controlling device of a wireless communication device.

A transmitting/receiving unit 202 is a communication circuit that receives and demodulates wireless signals, or modulates and transmits data or the like. A detection unit 203 is a unit for detecting a control station. The detection unit 203 can detect a control station by receiving a predetermined control signal (e.g., beacon frame) that is periodically transmitted by a control station. The detection unit 203 may be implemented as a detection module in the control unit 201.

A storage unit 204 is used as a work area such as the control unit 201 or a storage area of a control program. The storage unit 204 may be configured by RAM, ROM, a hard disk drive or the like. The storage unit 204 stores information on, for example, the current operating mode (control station mode, child station mode, dependent control station mode or the like) and information on a child station under its control.

The control unit 201 includes various function modules realized by hardware or software. A control station module 211 is a module for causing a wireless communication device to autonomously operate as a control station when a predetermined control signal cannot be received from any control stations. A child station module 212 is a module for causing a wireless communication device to operate as a child station when a predetermined control signal can be received from any of the control stations.

A dependent control station module 213 is a module which is started, when a wireless communication device operates as a child station and receives a predetermined control signal from another control station. The dependent control station module 213 is a module for causing a wireless communication device as a dependent control station. The dependent control station 213 forms a wireless network (e.g., dependent piconet) following the control station of itself by transmitting a predetermined signal being synchronized with the control station. The dependent control station module 213 transmits a depending request to a control station of itself when it starts operating as a dependent control station.

An administration module 214 is a module for administrating operation of other modules. The administration module 214 starts a child station module 212 or a dependent control station module 213, when a wireless communication device is operating as a control station and receives a predetermined signal from a dependent control unit, for example. The administration module 214 stops operation of the control station module 211 and starts the child station module 212 when it has no child station under its control, for example. The administration module 214 stops operation of the control station module 211 and starts the dependent control station module 213 when it has a child station under its control, for example.

Figure 3:
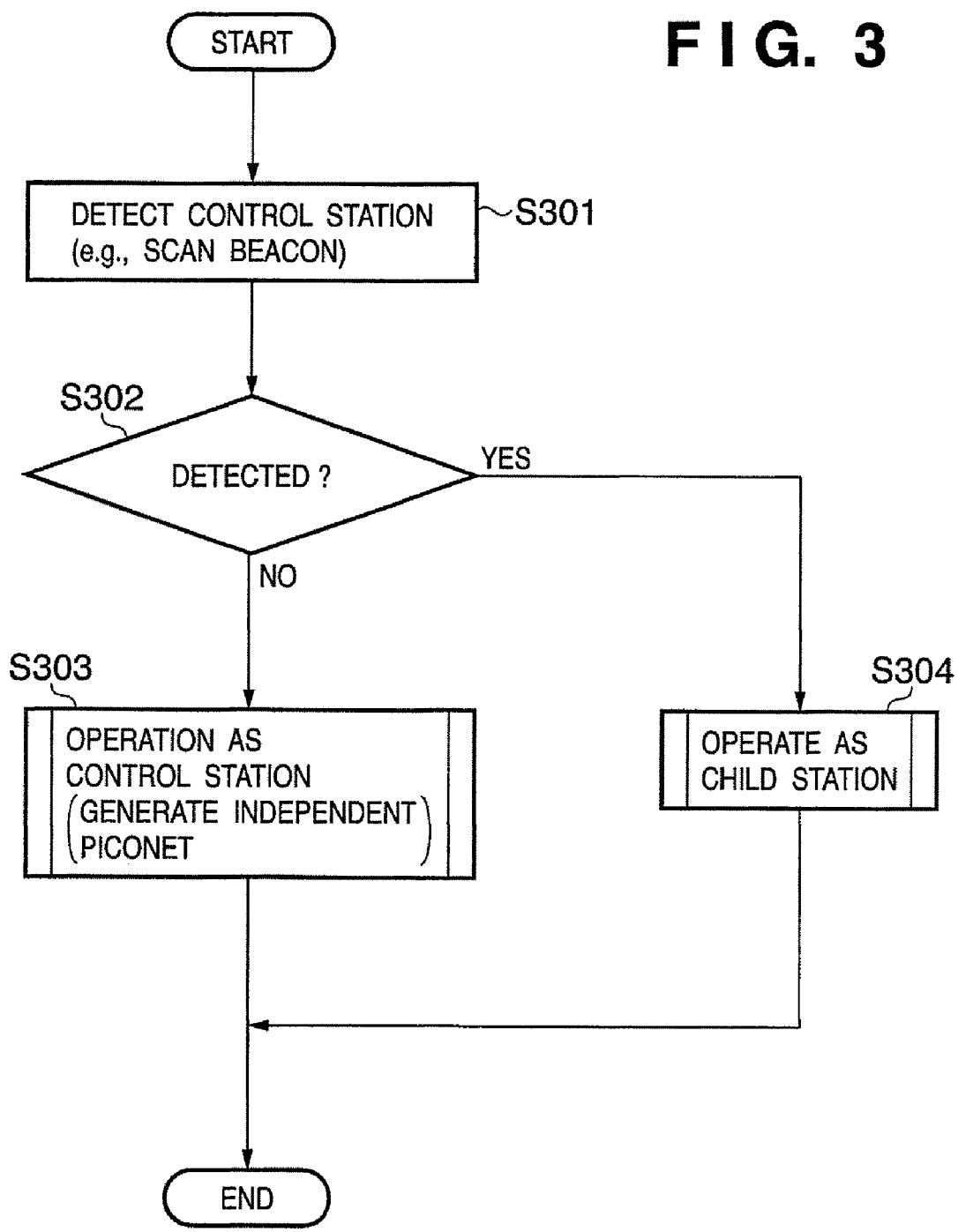
FIG. 3 is a flowchart showing a processing example of a wireless communication device in the embodiment.

FIG. 3 is a flowchart showing processing of a wireless communication device of the embodiment. The processing according to the flowchart is assumed to be executed by the administration module 214 when a wireless communication device is started, for example.

At the step S301, the control unit 201 detects whether another control station is around or not (has been started or not) by using the detection unit 203. For example, it determines whether a beacon frame that a control station is mandatory to transmit has been received or not.

At the step S302, the control unit 201 determines whether another control station is detected or not. If no control station is detected, operation proceeds to the step S303, where the control unit 201 starts operation as a control station. For example, it starts the control station module 211. On the other hand, if another control station is detected, operation proceeds to the step S304, where the control unit 201 starts operation as a child station. For example, it starts the child station module 212.

Figure 4:
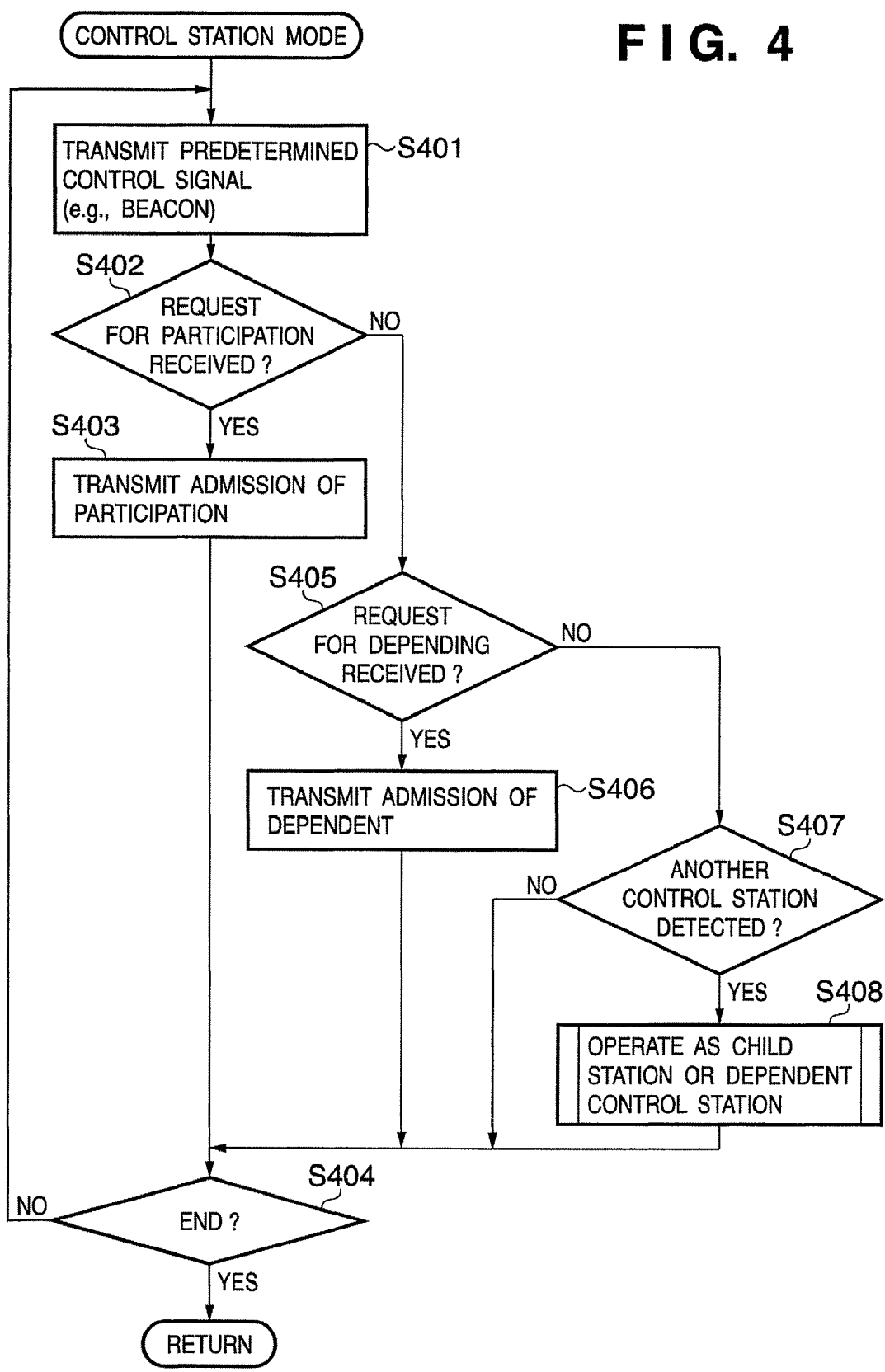
FIG. 4 is a flowchart showing an operation example as a control station in the embodiment.

FIG. 4 is a flowchart showing an operation example as a control station in the embodiment. The processing is described by assuming the step S303 as a sub routine for convenience. The processing is executed by the control station module 211 in the control unit 201.

At the step S401, the control unit 201 transmits a predetermined control signal (e.g. beacon frame or the like) by using the transmitting/receiving unit 202. Usually, as the control signal has a role of informing surrounding wireless communication device of the presence of a control station, it is desirable to be transmitted periodically. When the control signal is transmitted, a piconet is created. A cover area of a piconet is usually a range for a control signal can be reached.

At the step S402, the control unit 201 determines whether a request for participation to a piconet is received from a surrounding wireless communication device (child station) or not. If it is received, operation proceeds to the step S403, where the control unit 201 transmits an admission of participation to the piconet to the child station by using the transmitting/receiving unit 202. For example, the control unit 201 may administrate a child station under its control by listing information on child stations which admitted to participate and storing it in the storage unit 204.

At the step S404, the control unit 201 terminates the processing, if it is a time for terminating operation as a control unit, and returns to a main routine (FIG. 3). On the other hand, if it is not a time for terminating, it returns to the step S401.

If the request for participation is not received, operation proceeds to the step S405, where the control unit 201 determines whether a depending request is received or not. The depending request is a generation request of a dependent piconet which is transmitted from a child station under its control, for example. The dependent piconet will transmit and receive a wireless frame being synchronized with a higher order piconet. If the depending request is received, operation proceeds to the step S406, the control unit 201 transmits a depending admission by the transmitting/receiving unit 202. The depending admission may mean a generation admission of a dependent piconet, for example.

On the other hand, if the depending request is not received, operation proceeds to the step S407, where the control unit 201 determines whether the detection unit 203 has detected another control unit or not. If it detected another control unit, operation proceeds to the step S408, where the control unit 201 starts operation as a child station or a dependent control station according to the situation at that time. On the other hand, if another control unit is not detected, operation proceeds to the step S404.

Figure 5:
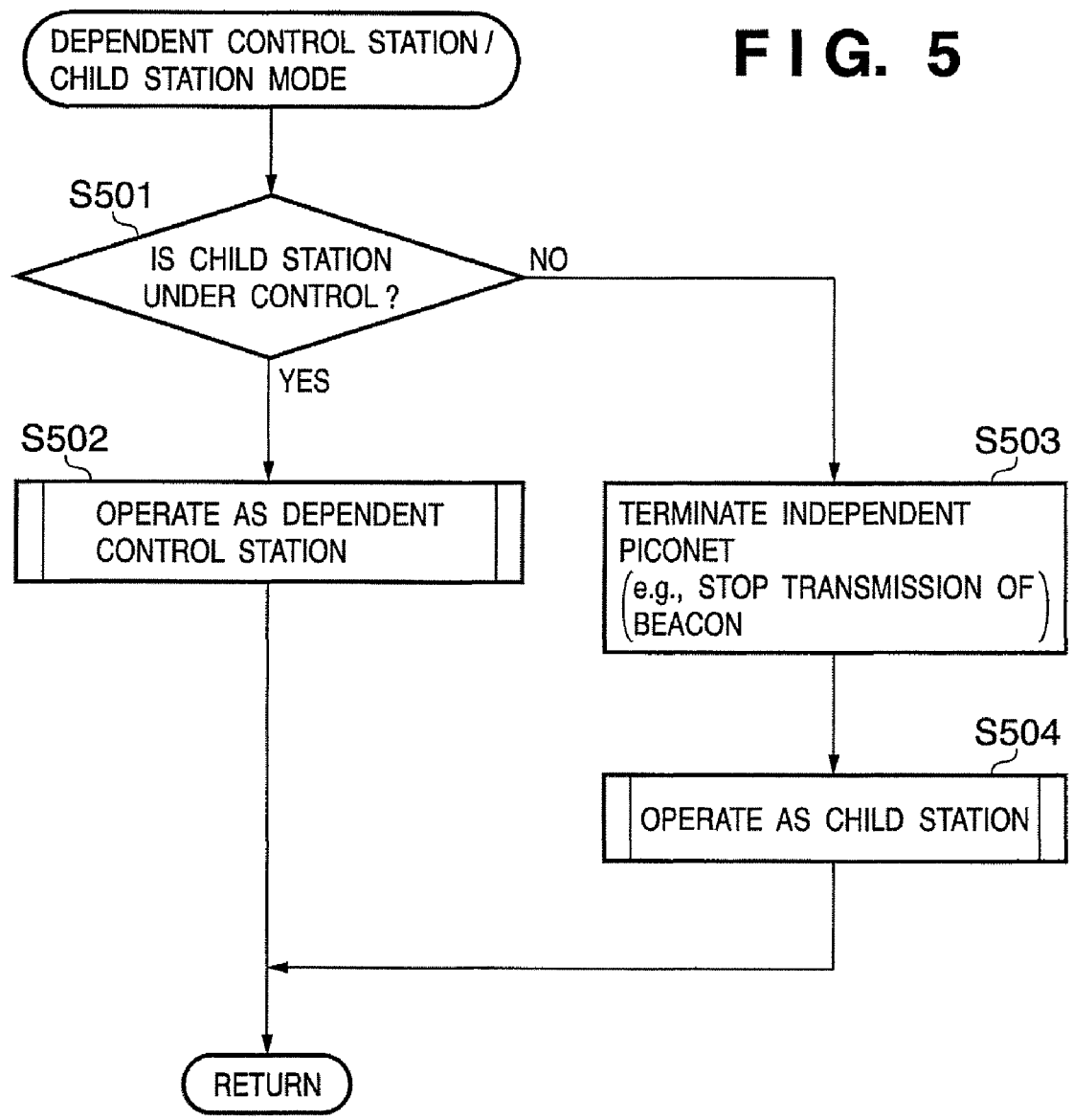
FIG. 5 is a diagram showing an operation example as a child station or a dependent control station in the embodiment.

FIG. 5 is a diagram showing an operation example as a child station or a dependent control station in the embodiment. The processing is described by assuming the step S408 as a sub routine for convenience. The processing is executed by the control station module 211 or the administration module 214 in the control unit 201, for example.

At the step S501, the control unit 201 determines whether it has a child station under its control or not. If the control unit 201 has a child station under its control, operation proceeds to the step S502, where it starts operation as a dependent control unit. For example, the control unit 201 starts the dependent control station module 213.

On the other hand, if it has no child station under its control, operation proceeds to the step S503, where the control unit 201 terminates forming of its own piconet. For example, the control unit 201 stops transmission of a beacon frame from the transmitting/receiving unit 202.

At the step S504, the control unit 201 starts operation as a child station. For example, the control unit 201 starts the child station module 212.

Figure 6:
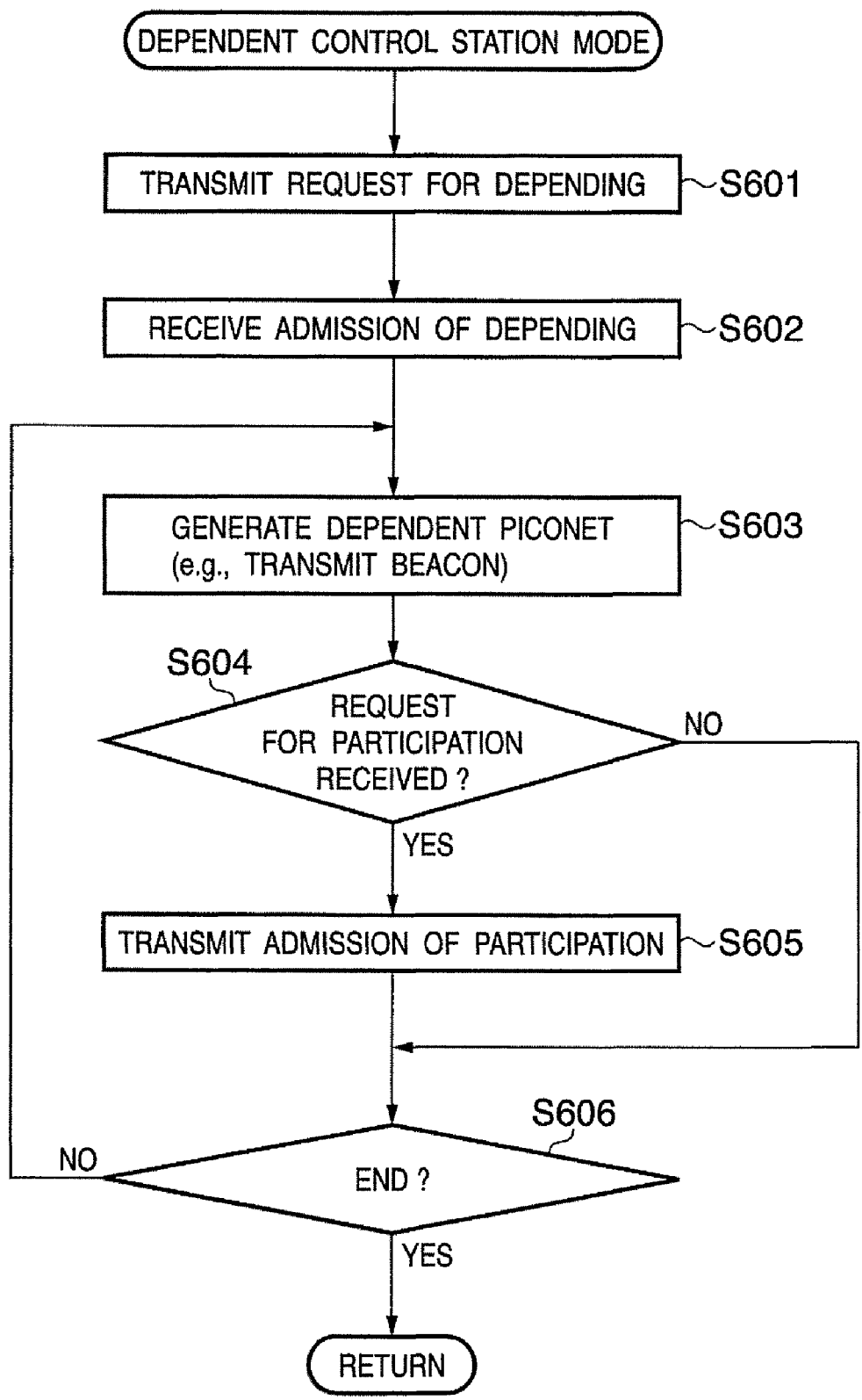
FIG. 6 is a flowchart showing an operation example of a dependent control station in the embodiment.

FIG. 6 is a flowchart showing an operation example of a dependent control station in the embodiment. The processing is executed by the dependent control station module 213, for example. The processing is described by assuming the step S502 as a sub routine.

At the step S601, the control unit 201 transmits a depending request to its own control unit by using the transmitting/receiving unit 202. At the step S602, the control unit 201 receives a depending admission from its own control unit by using the transmitting/receiving unit 202. At the step S603, the control unit 201 generates a dependent piconet. For example, the control unit 201 transmits a beacon frame by using the transmitting/receiving unit 202.

At the step S604, the control unit 201 determines whether a request for participation to a piconet is received from a surrounding wireless communication device (child station) or not. If it is received, operation proceeds to the step S605, where the control unit 201 transmits an admission of participation to a piconet to a child station by using the transmitting/receiving unit 202. For example, the control unit 201 may administrate a child station under its control by listing information on child stations which admitted to participate and storing it in the storage unit 204.

At the step S606, the control unit 201 terminates the processing, if it is a time for terminating operation as a dependent control unit, and returns to the routine. It may return to a main routine (FIG. 3). On the other hand, if it is not a time for terminating, it returns to the step S603.

Figure 7:
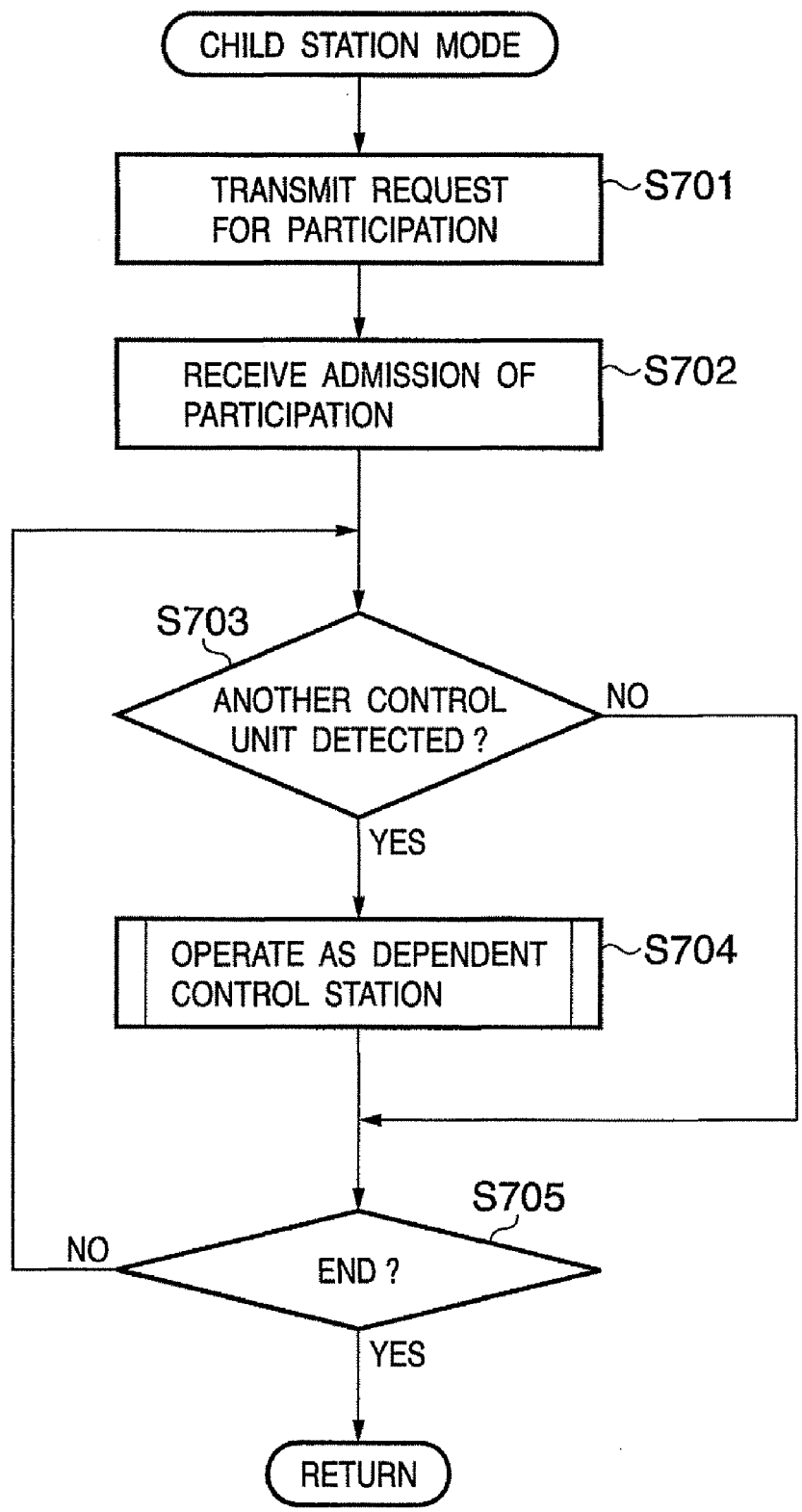
FIG. 7 is a flowchart showing operation of a child station in the embodiment.

FIG. 7 is a flowchart showing an operation example of a child station in the embodiment. The processing is executed by the child station module 212, for example. It is described by assuming the step S304 and the step S502 as a sub routine.

At the step S701, the control unit 201 transmits a request for participation to a control unit by using the transmitting/receiving unit 202. At the step S702, the control unit 201 receives an admission of participation from a control unit of its own by using the transmitting/receiving unit 202.

Operation proceeds to the step S703, where the control unit 201 determines whether another control unit has been detected by the detection unit 203 or not. If it detects another control unit, operation proceeds to the step S704, where the control unit 201 starts operation as a dependent control unit (FIG. 6). On the other hand, if is has not detected another control unit, operation proceeds to the step S705.

At the step S704, the control unit 201 terminates the processing, if it is a time for terminating operation as a dependent control unit, and returns to the routine. It may return to a main routine (FIG. 3). On the other hand, if it is not a time for terminating, operation proceeds to the step S703.

Figure 8:
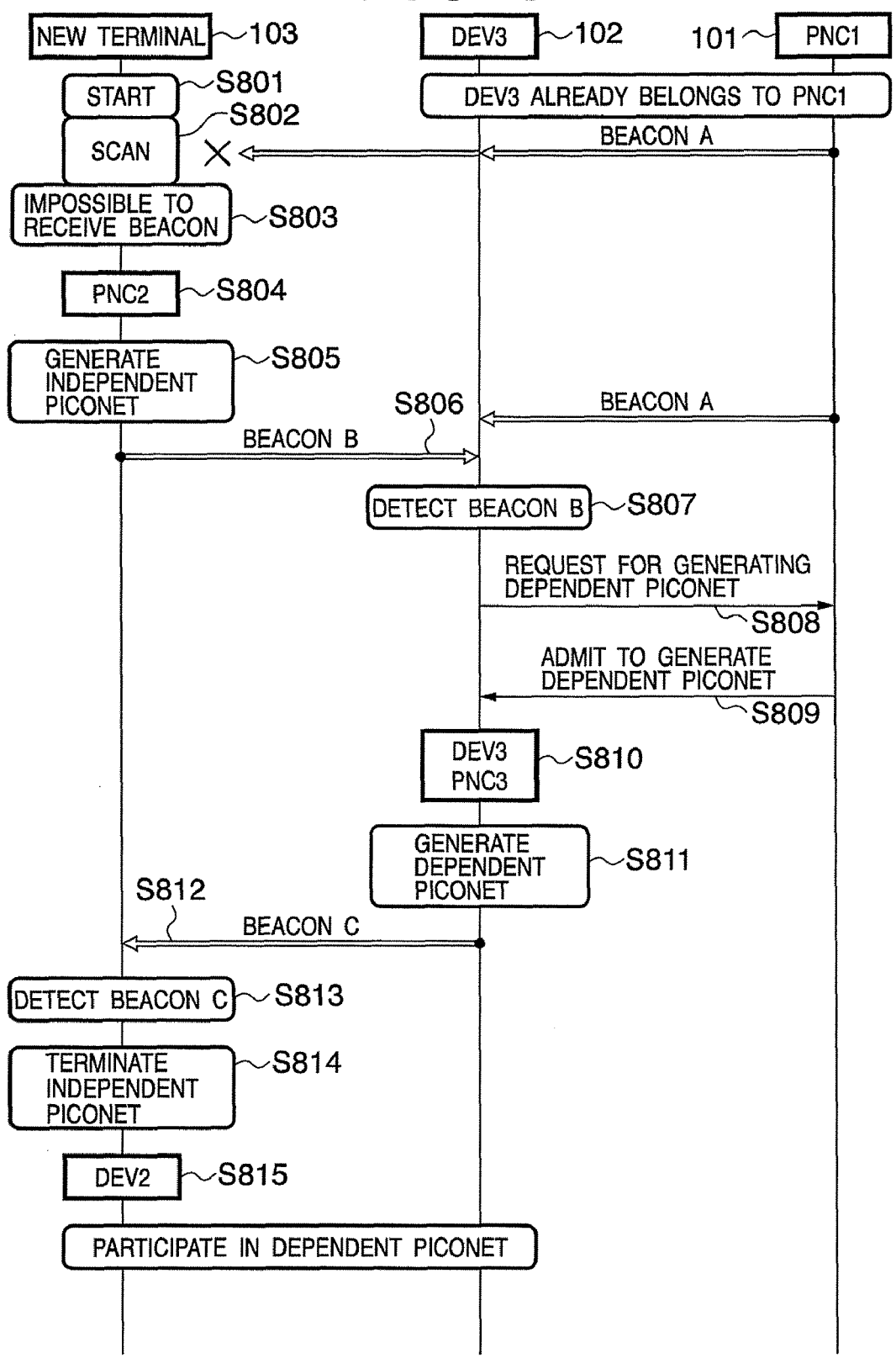
FIG. 8 is a sequence diagram showing operation examples of an existing control station, an existing child station and a new terminal in the embodiment.

FIG. 8 is a sequence diagram showing operation of an existing control station, an existing child station and a new terminal in the embodiment. Here, an embodiment showing how a plurality of wireless communication devices placed as shown in FIG. 1 operate will be described. The existing control unit (PNC1) corresponds to the wireless communication device 101. The existing child station (DEV3) corresponds to the wireless communication device 102. A new terminal corresponds to the wireless communication device 103.

The existing control station (PNC1) is assumed to have already generated the existing piconet 100 and periodically is transmitting a beacon frame A. The existing station (DEV3) is assumed to be operating as being synchronized with the existing piconet 100 based on the beacon frame A.

First, when a new wireless communication device (hereinafter referred to as a new terminal) 103 is powered on (S801), the new terminal executes channel scanning according to processing defined by IEEE802.15.3 protocol (S802). With that, a wireless frame transmitted around is intercepted.

If the new terminal is near enough to the existing control unit (PNC1) to receive the beacon frame A from the existing control unit (PNC1), the new terminal starts connecting operation to the existing control unit (PNC1). But if no beacon frame A cannot be received as in the sequence (S803), the new terminal becomes a new control station (PNC2) (S804).

The new control station (PNC2) generates an independent piconet 110 (S805). The new control station (PNC2) periodically transmits a beacon frame B (S806). As the new control station (PNC2) cannot receive the beacon frame A from the existing control station (PNC1), it operates without being synchronized with the existing control station (PNC1). Therefore, the beacon frame A and the beacon frame B will be periodically transmitted at asynchronous timing, respectively.

The wireless communication device 102 operating as the existing child station (DEV3) will receive the beacon frame B anew. This is why that the existing child station (DEV3) is placed in the overlap area 115.

When the existing child station (DEV3) detects the beacon frame B (S807), it recognizes that an independent piconet 110 is generated near the existing piconet 100 anew. The existing child station (DEV3) transmits a request for generation of a dependent piconet to the existing control station (PNC1) (S808). When the existing control station (PNC1) admits to generate a dependent piconet in response to the request (S809), the existing child station (DEV3) becomes a dependent control station (DEV3/PNC3) (S810). The dependent control station (DEV3/PNC3) forms a dependent piconet 120 (S811). That is to say, the dependent control station (DEV3/PNC3) starts transmitting a beacon frame C according to timing allocated to it (S812).

When the wireless communication device 103 that is operating as a new control station (PNC2) receives the beacon frame C (S813), it determines whether the wireless communication device 103 contains a child station or not. If it does not contain a child station as mentioned above, it needs not to keep in operating as a control station. Therefore, the wireless communication device 103 terminates the already formed independent piconet 110 (S814), and switches an operation mode from the control station (PNC2) to the child station (DEV2) (S815). The wireless communication device 103 that becomes the child station (DEV2) executes connecting operation on the dependent control unit (DEV3/PNC3) that is a control station of the dependent piconet 120.

As mentioned above, according to the present embodiment, a child station under the control of the first control station detects the second control station by the detection unit 203. When the second control station is detected, the control unit 201 of the child station operates as a dependent control station depending on the first control station. That causes the second control station to change to a child station or a dependent control station.

Accordingly, although the first control station and the second control station do not directly recognize each other and an overlap area is present among piconets and a child station is placed there, the invention according to the embodiment can suppress wireless frame collision.

That is to say, the piconet 110 is changed to a dependent piconet 120 when a dependent control station is provided for the piconet 100 and the piconet 110 which are operating asynchronously to each other. As that causes both piconets to operate synchronously with each other, a preferred network topology with improved throughput can be realized.

Particularly, when the control unit 201 of a child station receives a predetermined control signal from other control station, it operates as a dependent control station. That is to say, it switches an operation mode. The dependent control station module 213 of the control unit 201 can change that other control station to a child station or a dependent control station by transmitting a predetermined control signal.

When that other control station receives a predetermined control signal from a dependent control station, it operates as a child station or a dependent station according to whether a child station is present under its own control or not. This is why that it may break a communication from the contained child station when it is changed into a child station even if it is a control station containing a child station.

When the control unit 201 starts operation as a dependent control station, it transmits a depending request to a control station of its own. As that causes communication timing of a dependent control station (dependent piconet) to be allocated from its own control station, a piconet and a dependent piconet of the control station of its own can be operated being synchronized with each other.

Second Embodiment

For FIG. 8, a case where a new control station that does not contain a child station is switched from a control station to a child station has been described. In the second embodiment, a case where the present invention is applied to a new control station that already contains a child station will be introduced.

Figure 9:
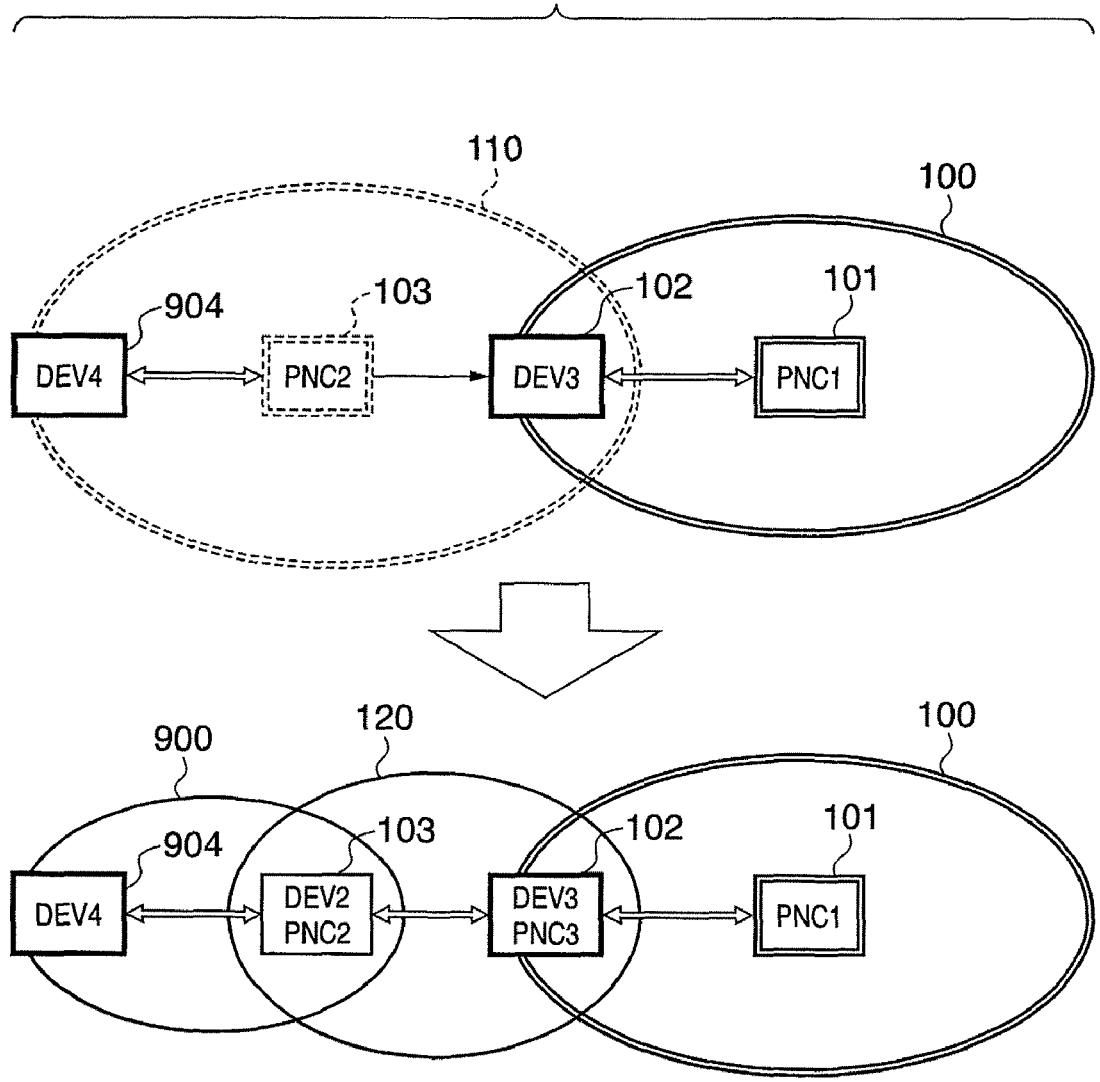
FIG. 9 is a diagram showing a configuration example of a piconet in a second embodiment.

FIG. 9 is a diagram showing a configuration example of a piconet in a second embodiment. Being compared with FIG. 1, it is different in that a wireless communication device 904 that is operating as a child station (DEV4) is present under the control of the control station (PNC2). Under such a circumstance, it is not preferable to simply change the control station (PNC2) to a child station. This is why that the child station (DEV4) is isolated and communication is broken.

For example, according to IEEE802.15.3 standard, when the first control station recognizes the second control station, it can be a dependent control station that operates as synchronized with the second control station. That reduces interference among piconets.

As shown in FIG. 9, however, if two control stations PNC1 and PNC2 cannot receive each other's beacon frame, there is a problem to which a solving method by IEEE802.15.3 standard cannot be applied. That is to say, each of them cannot be a dependent control station to each other. Therefore, a network topology is difficult to be kept in a preferred state.

If a child station (DEV4) is present under the control of the control station (PNC2), the control station (PNC2) is changed to the dependent control station (DEV2/PNC2). That can make a parent piconet 100, a dependent piconet 120 and a further dependent piconet 900 synchronized with one another and operate. Therefore, the invention according to the embodiment can prevent the degradation of throughput due to conventional wireless frame collision.

Figure 10:
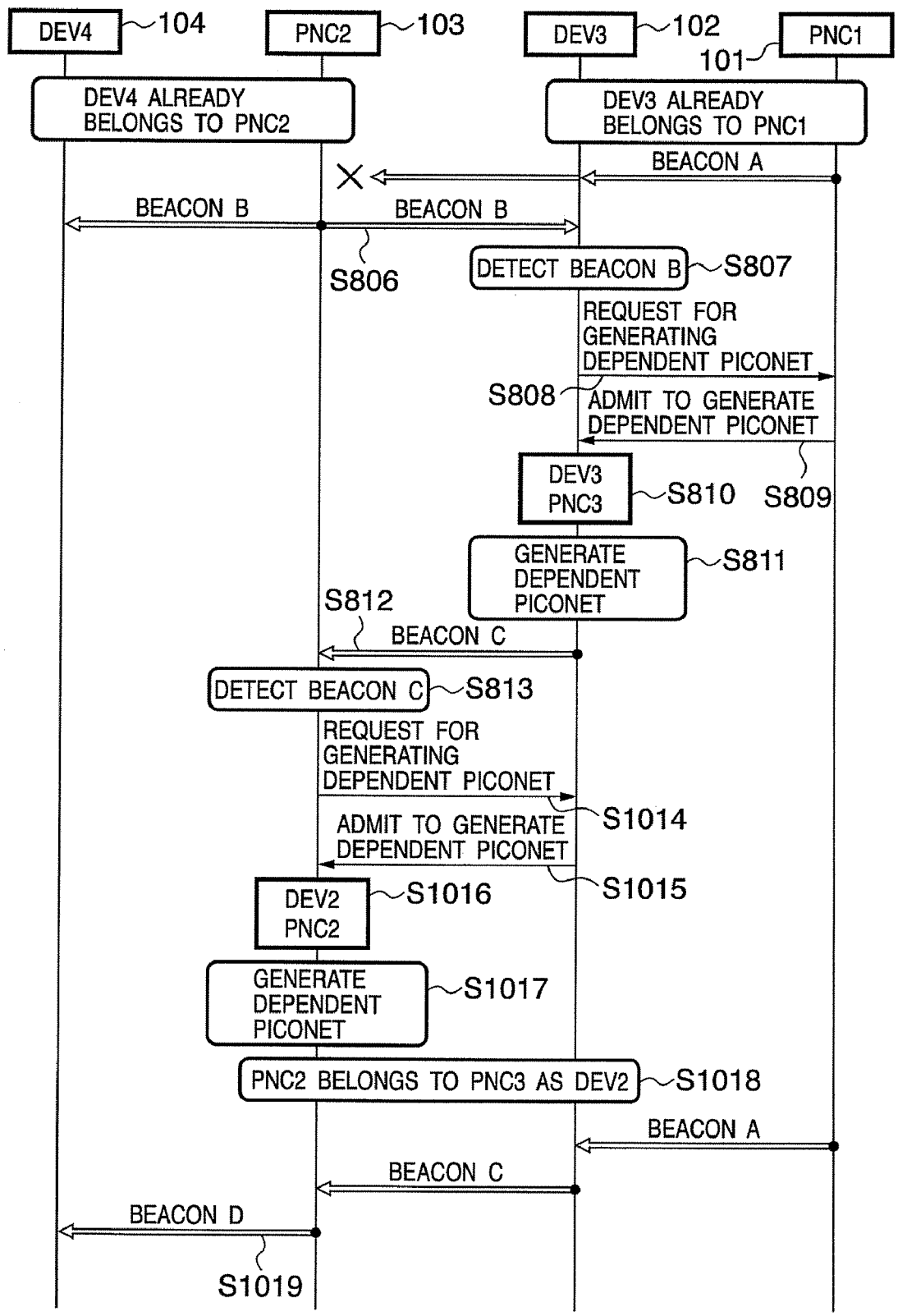
FIG. 10 is a sequence diagram showing an operation example of each wireless communication device of the second embodiment.

FIG. 10 is a sequence diagram showing an operation example of each wireless communication device in the embodiment. The description will be simplified as the same reference numerals are given to the places already described.

Here, the existing control station (PNC1) is assumed to form an existing piconet 100 and contain an existing child station (DEV3). The new control station (PNC2) is assumed to form an independent piconet 110 and contain another child station (DEV4).

Processing from the existing child station (DEV3) that detected the beacon frame B transmitted from the new control station (PNC2) becomes the dependent control station (DEV3/PNC3) until it generates the dependent piconet 120 is the same as that described with reference to FIG. 8.

The new control station (PNC2) that received a beacon frame C determines whether it already contains a child station or not. The determination processing is the same as that described as the step S501 of FIG. 5. If a child station is contained, operation as a control station needs to be kept. Then, the new control station (PNC2) requests a dependent control station (DEV3/PNC3) to generate a dependent piconet so that it becomes a dependent control station (DEV2/PNC2) (S1014).

If the request is admitted (S1015), the new control station (PNC2) becomes another dependent control station (DEV2/PNC2) (S1016), and forms another dependent piconet 900 (S1017). It is needless to say that the wireless communication device 103 that is operating as a dependent control station (DEV2/PNC2) is participating as a child station in the dependent piconet (S1018).

The child station (DEV4) participates in the dependent piconet 900 with a beacon frame D which is transmitted by the dependent control station (DEV2/PNC2) (S1019).

As mentioned above, when the new control station (PNC2) receives a predetermined control signal from a dependent control station (DEV3/PNC3) and it has a child station under its own control, it starts operation as a dependent control station.

That can alleviate a possibility of breaking communication of a child station that is contained in the new control station (PNC2).

A parent piconet 100, a dependent piconet 120 and another dependent piconet 900 can be synchronized with one another and operated. Therefore, the invention according to the embodiment can prevent the degradation of throughput due to conventional wireless frame collision.

Third Embodiment

The case according to the above-mentioned embodiment has been described by assuming that a single existing child station is present in an overlap area. Actually, however, a plurality of existing child stations may be present.

Figure 11:
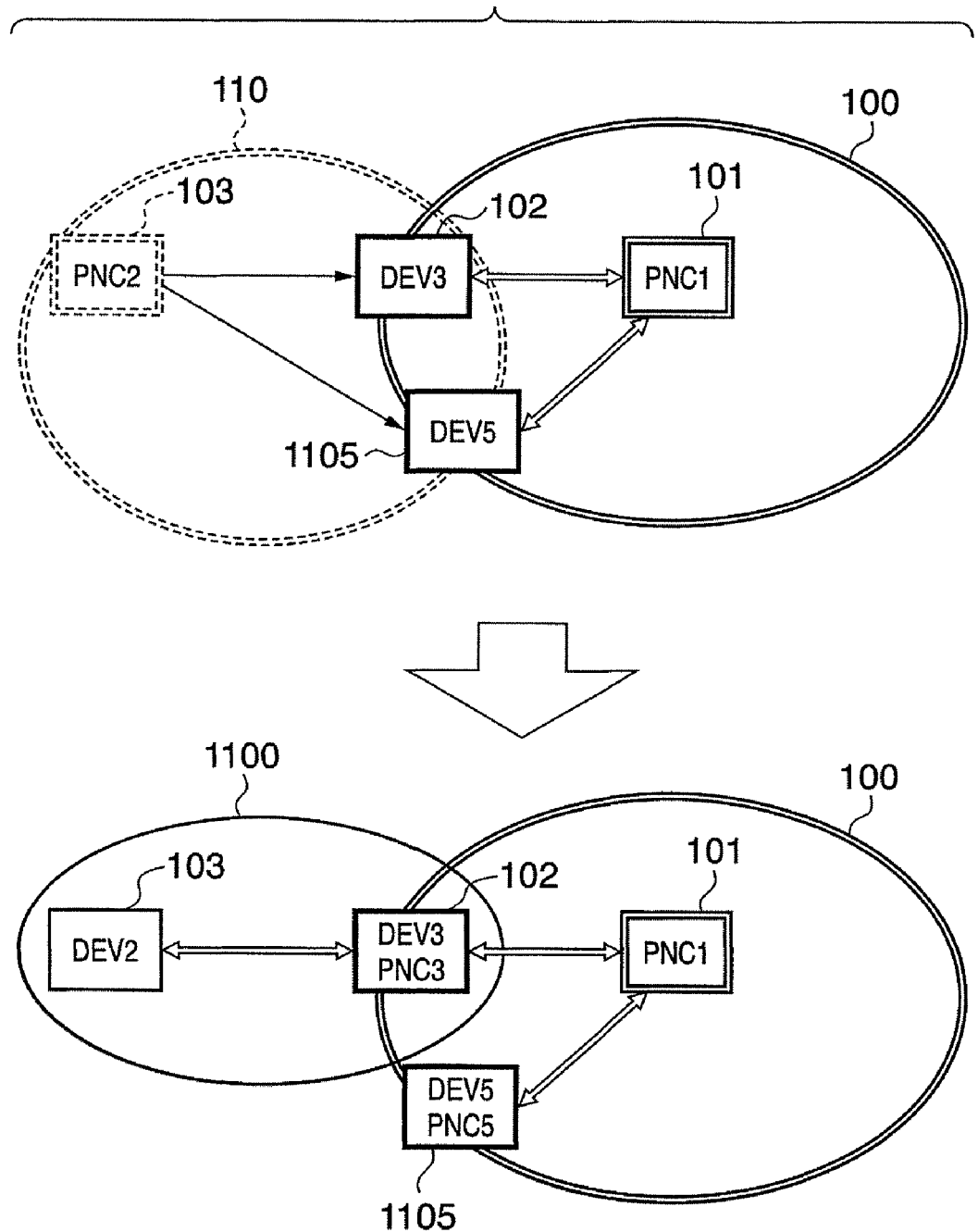
FIG. 11 is a diagram showing a configuration example of a piconet in a third embodiment.
Figure 12:
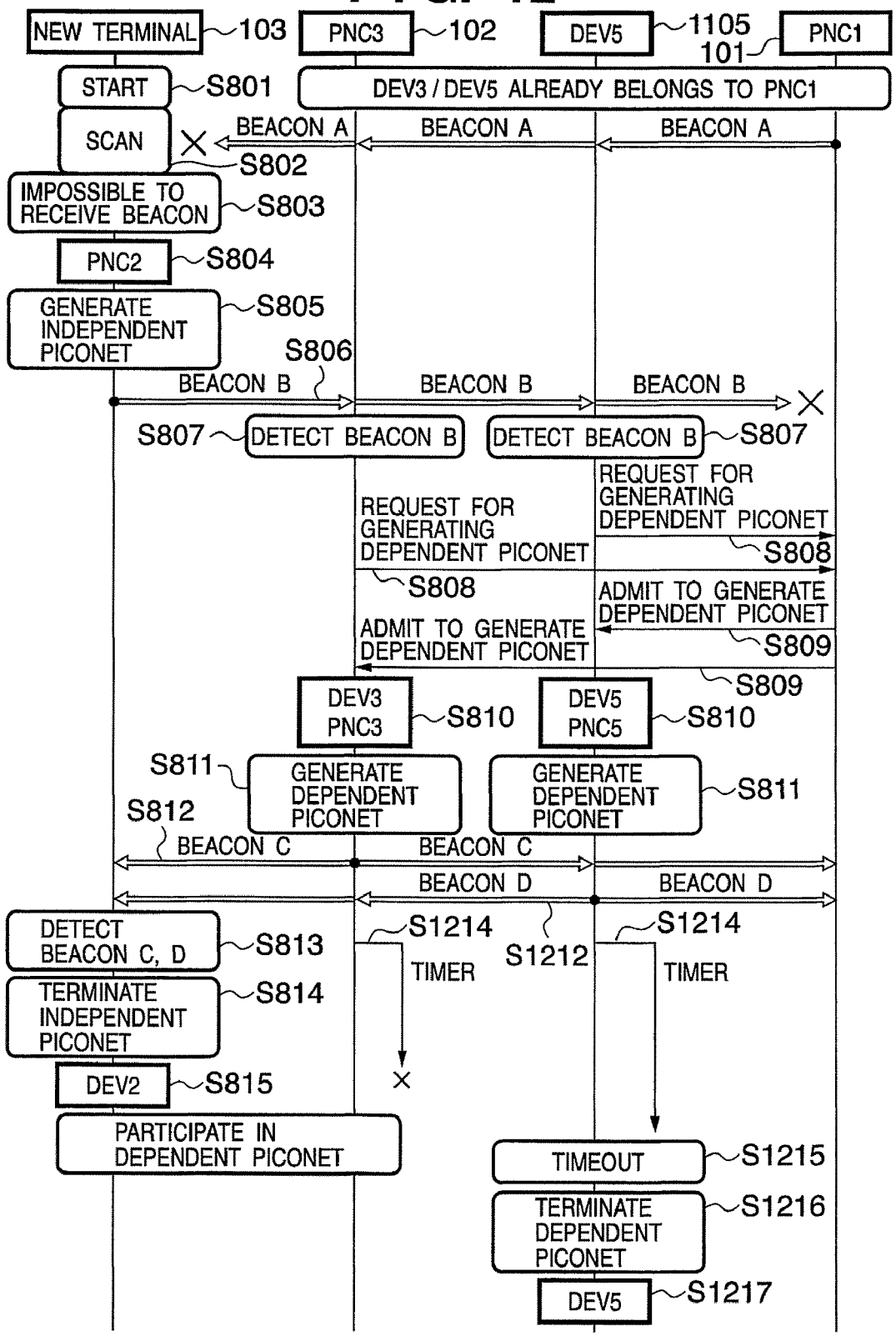
FIG. 12 is a sequence diagram showing an operation example of each wireless communication device in the third embodiment.

FIG. 11 is a diagram showing a configuration example of a piconet in a third embodiment. FIG. 12 is a sequence diagram showing an operation example of each wireless communication device in the third embodiment. The description will be simplified as the same reference numerals are given to the places already described.

According to FIG. 11, the existing control station (PNC1) forms the existing piconet 100. The existing child station (DEV3) and another existing child station (DEV5) are contained in the existing piconet 100. The wireless communication device 1105 is assumed to be operating as another existing child station (DEV5).

It is assumed that a new wireless communication device 103 is powered on near the existing piconet 100 in such a situation (S801). The wireless communication device 103 cannot receive a beacon frame that is transmitted from the existing control station (PNC1) (S802, S803). This is why that the wireless communication device 103 and the existing control station (PNC1) are apart from each other by enough distance. Therefore, the wireless communication device 103 starts operation as a new control station (PNC2) (S804) and forms an independent piconet 110 (S805).

The existing child station (DEV3) and another child station (DEV5) that received the beacon frame B transmitted from the new control station (PNC2) request the existing control station (PNC1) to generate a dependent piconet (S806-S808). When the existing child station (DEV3) and another existing child station (DEV5) receive an admission of generation, they become dependent control stations (DEV3/PNC3) and (DEV5/PNC5), respectively, and form different dependent piconets (S809-S811).

As a result, the dependent control station (DEV3/PNC3) starts transmitting the beacon frame C (S812). Similarly, the dependent control station (DEV5/PNC5) starts transmitting the beacon frame D (S1212).

Here, the dependent control station (DEV3/PNC3) and (DEV5/PNC5) start a timer for counting a predefined time period, respectively (S1214). If a child station does not participate in even after a predefined time period has passed, the dependent control station needs not to operate as a control station. Then, the control unit 201 stops a dependent control station module 213 and starts the child station module 212 again by using a timer, for example.

The new control station (PNC2) that received the beacon frame C and D recognizes that dependent control stations which it can be connected to are present around it (S813). Then, the control station (PNC2) selects either of the plurality of dependent control stations and executes connecting operation to the selected dependent control station. A method for selecting a single dependent control station may be various. For example, the control unit 201 may determine a dependent control station with a function which is preferable to itself by comparing functions of respective dependent control stations included in a beacon frame. It is needless to say that another selecting method such as to select better signal quality (signal strength, error rate, or the like) may also be used.

In the case according to the embodiment, it is assumed that a dependent control station (DEV3/PNC3) is selected. The new control station (PNC2) terminates an independent piconet 110 (S814) and starts operation as a child station (DEV2).

The new child station (DEV2) executes connecting operation such as a request for participation to the selected dependent control station (DEV3/PNC3). If the new child station (DEV2) transmits a request for participation before a timer expires, the dependent control station (DEV3/PNC3) admits the new child station (DEV2) to participate in the dependent piconet 110. It is needless to say that the dependent control station (DEV3/PNC3) keeps operating as a dependent control station even after it contains the child station (DEV2).

On the other hand, because the dependent control station (DEV5/PNC5) once became a dependent control station but is not selected by the new child station (DEV2), the above-mentioned timer should expire (S1215). Therefore, the control unit 201 terminates operation as a dependent control station as the above-mentioned timer expires (S1216), and resumes operation as an original existing child station (DEV5) (S1217).

Figure 13:
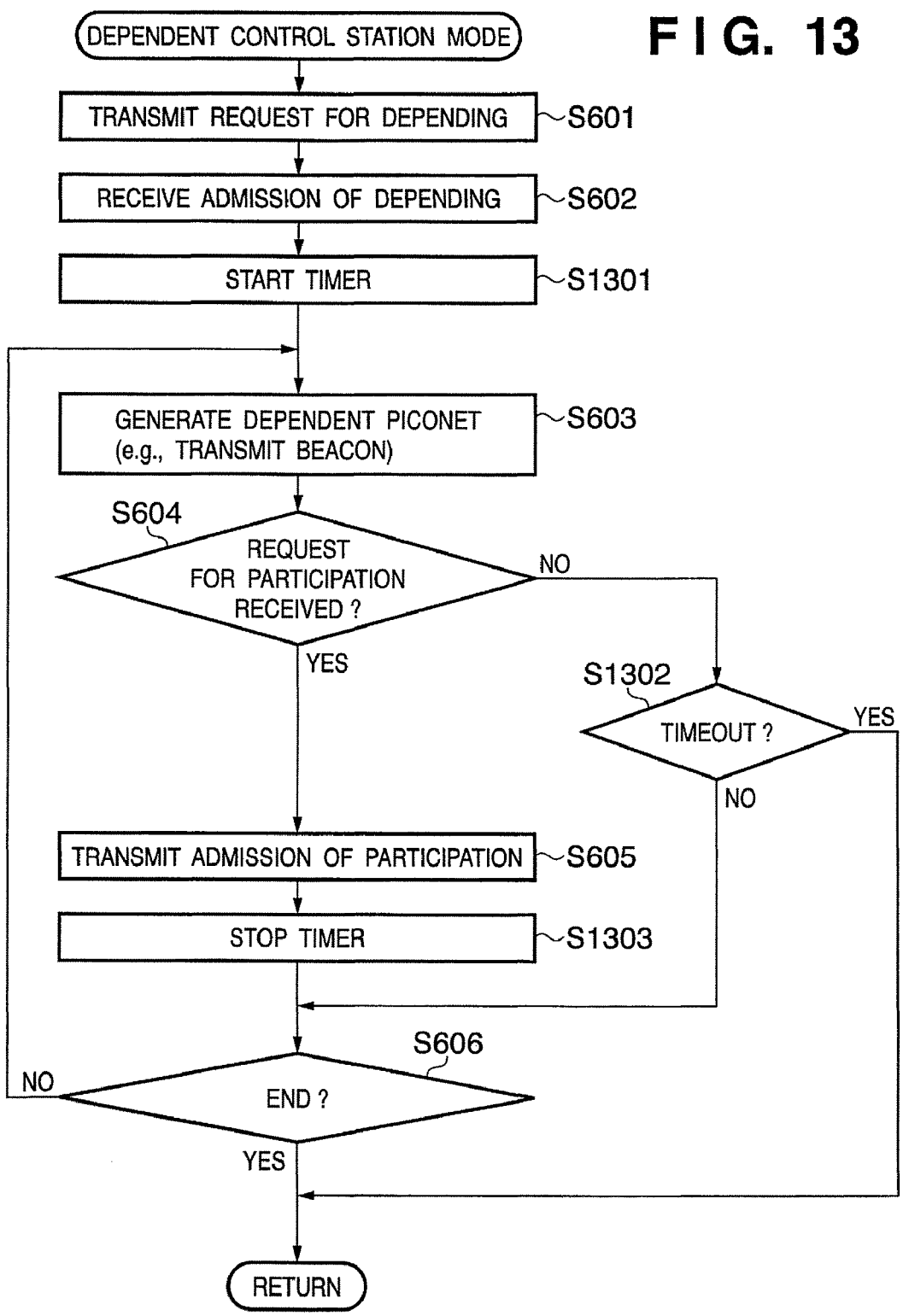
FIG. 13 is a flowchart showing an operation example of a dependent control station in the third embodiment.
Figure 14:
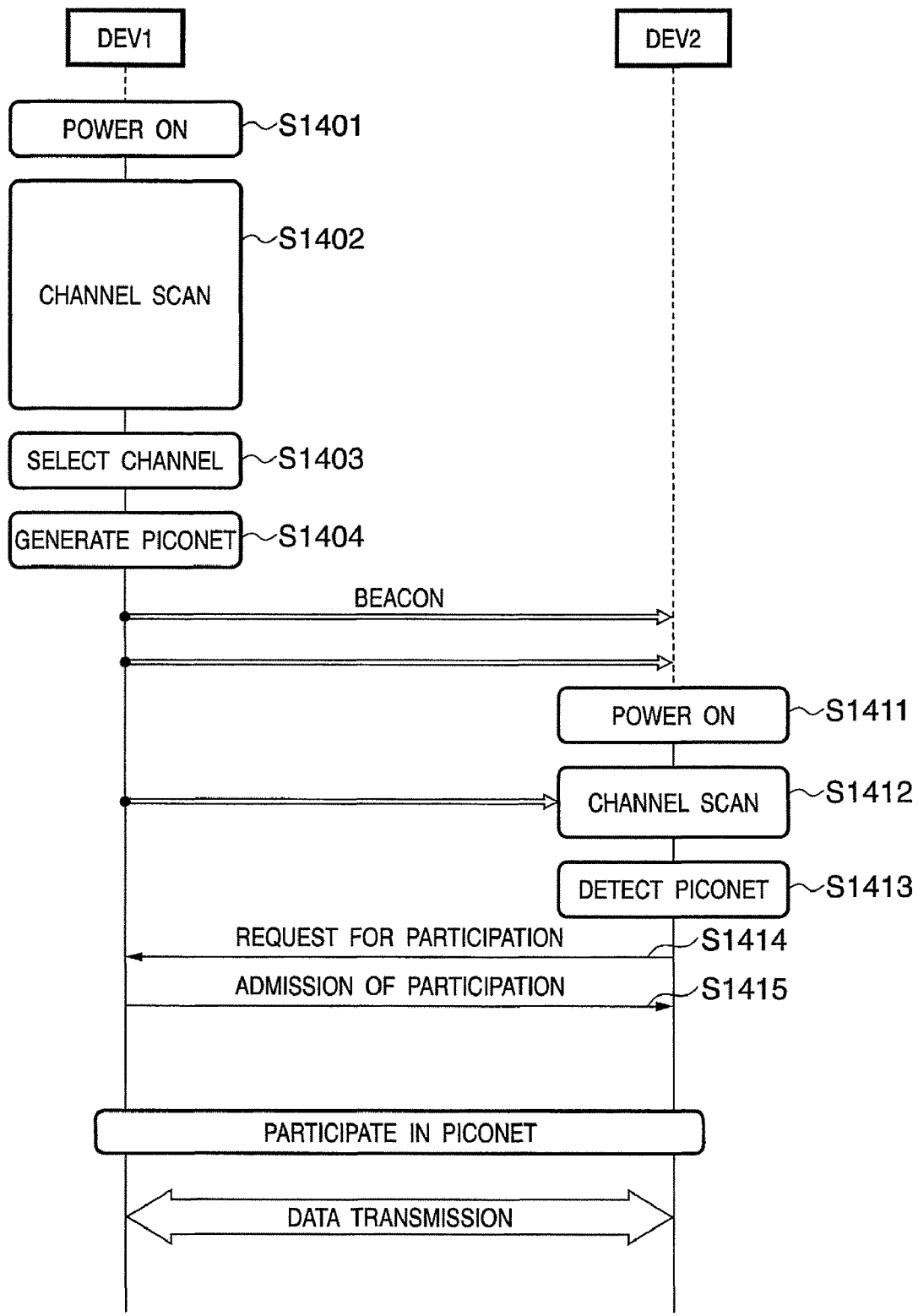
FIG. 14 is a sequence diagram representing a generating procedure of a piconet in a WPAN.
Figure 15:
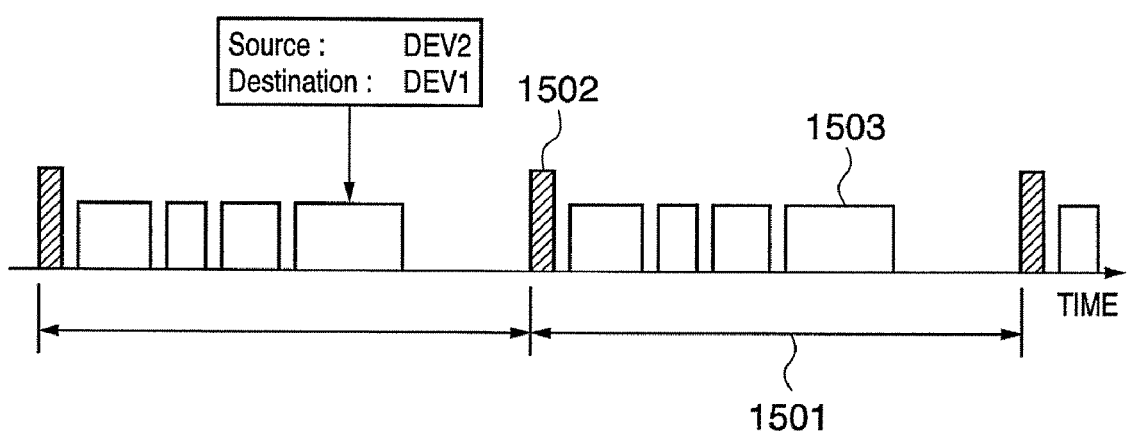
FIG. 15 is a diagram showing a principle of a TDMA access system in a WPAN.
Figure 16:
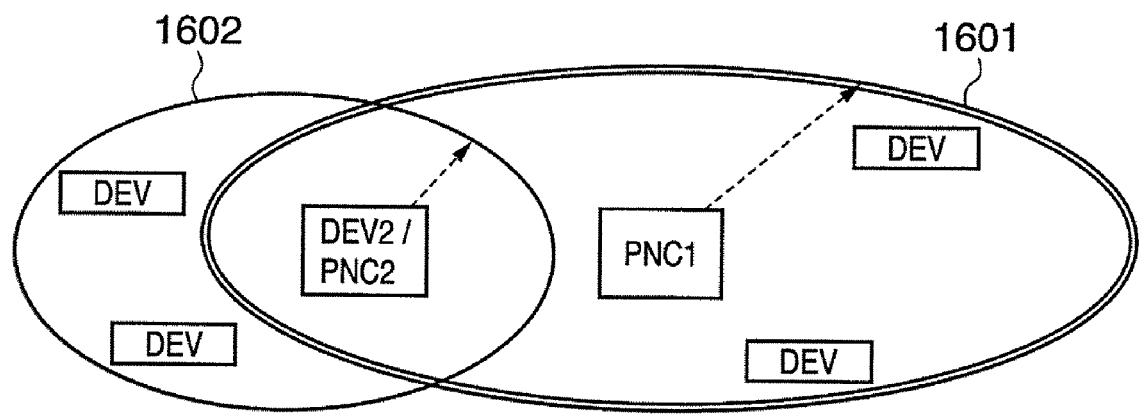
FIG. 16 is a diagram showing a configuration of a parent piconet and a dependent piconet.

FIG. 13 is a flowchart showing an operation example of a dependent control station in the third embodiment. The description will be simplified as the same reference numerals are given to the places already described. As mentioned above, the dependent control station is assumed as realized by the dependent control station module 213 of the control unit 201.

When the control unit 201 receives a dependent admission, it starts a timer for counting a predetermined time period at the step S1301. Thereafter, it transmits a beacon frame and forms a dependent piconet (S603).

If it is determined that a request for participation is not received at the step S604, the control unit 201 proceeds to the step S1302 and determines whether the timer expires or not. If the timer is made time out, the control unit 201 terminates processing according to the flowchart to resume operation of the child station. When the processing is terminated, the child station module 212 will start again.

On the other hand, if an admission of participation is received, the control unit 201 transmits an admission of participation (S605). Then at the step S1303, the control unit 201 stops clocking of the timer.

As mentioned above, according to the embodiment, even if a plurality of dependent control stations operate when a timer is introduced, a dependent control station that is not selected by the new child station can be returned to a child station. That can stop undesired operation as a dependent piconet and keep a network topology to a preferred state.

Other Embodiment

Although various embodiments have been described in detail, the present invention may be applied to a system consisting of a plurality of appliances or may be applied to a device consisting of a single appliance. The present invention is not limited to be applied to a wireless communication device but can be applied to a wired communication device.

The present invention can be achieved by supplying a software program for realizing each function of the above-mentioned embodiments directly or from a distance to a system or a device and by causing a computer included in the system to read out and execute the supplied program codes. As a software program, a program corresponding to a flowchart shown in any of FIGS. 3 to 7 or 13 is known.

Therefore, the program codes to be installed into a computer to realize the functions and processing of the present invention in the computer are also to realize the present invention. That is to say, a computer program for realizing the functions and processing is also one of the present inventions.

In such a case, any form of programs such as an object code, a program to be executed by an interpreter, a script data to be supplied to an OS or the like, can be used if only it has a function of a program.

As a recording medium for supplying a program, a flexible disk, a hard disk, an optical disk, an optical magnetic disk, MO, CD-ROM, CD-R, CD-RW or the like are known. As a recording medium, a magnetic tape, a non-volatile memory card, ROM, DVD (DVD-ROM, DVD-R) or the like are known.

The program may be downloaded from a homepage on the Internet by using a browser of a client computer. That is to say, a computer program of the present invention or a file compressed and including an automatic installing function may be downloaded from the homepage to a recording medium such as a hard disk. It can also be realized by dividing the program code forming a program of the present invention into a plurality of files and downloading respective file from different homepages. That is to say, a WWW server for letting a plurality of users to download a program file for realizing the functional operation of the present invention in a computer may be a component of the present invention.

A program of the present invention may be encrypted and stored in a storage medium such as CD-ROM or the like and distributed to users. In such a case, only a user who fulfilled a predetermined condition may be permitted to download key information to decrypt the encryption from the homepage via the Internet and the program which has been encrypted may be decoded with the key information and executed, and the program may be installed into a computer.

The above-mentioned functions of the embodiments can be realized by a computer executing the read out programs. Based on an instruction of the program, an OS or the like which is running on a computer may execute a part or all of the actual processing. It is a matter of course that the above-mentioned functions of the embodiments can also be realized in this case.

The program which is read out from the recording medium may be written into a function extension board that is inserted into a computer or memory provided for a function extension unit that is connected to a computer. Based on an instruction of the program, a CPU or the like provided for the function extension board or the function extension unit may execute a part or all of the actual processing. In this manner, functions of the above-mentioned embodiments may be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-234696, filed Aug. 12, 2005, which is hereby incorporated by reference herein in its entirety.

What is claimed is:

1. A communication system having reduced wireless frame collision, comprising:

a plurality of communication devices each of which selectively operates as any one of a control station, a dependent station and a dependent control station, said control station being a communication device which controls communication conducted in a network established by the control station itself, said dependent station being a communication device which participates in a network established by other communication device, and said dependent control station being a communication device which participates in a network established by an other communication device, establishes a dependent network synchronized with the network established by the other communication device and controls communication conducted in the dependent network established by the dependent control station itself, wherein a second communication device is configured to operate as a dependent station of a first communication device configured to operate as a control station of a first network, said second communication device comprises:

a detection unit configured to detect a third communication device that started operation as another control station of a second network which is not synchronized with the first network and wherein collision of wireless frames between the first and second networks occur; and a control unit configured to switch said second communication device such that said second communication device works as a dependent control station which is controlled by said first communication device in the first network and which establishes and controls a dependent network dependent on the first network so as to synchronize communication in the second network with communication in the first network through the dependent network and wherein wireless frame collision is suppressed between the first network and the second network having said synchronized communication, when said third communication device is detected, wherein said control unit of said second communication device is configured to determine whether said third communication device requests said second communication device to participate in the dependent network established by said second communication device within a predetermined time of when said second communication device starts working as a dependent control station, and wherein said control unit of said second communication device is configured to re-switch said second communication device from the dependent control station to a dependent station if said third communication device does not request said second communication device to participate in the dependent network established by said second communication device within the predetermined time, and configured to make said second communication device to continue working as the dependent control station if said third communication device requests said second communication device to participate in the dependent network established by said second communication device within the predetermined time, said third communication device comprises:

a detection unit configured to detect said second communication device switched to the dependent control station; and a control unit configured to confirm whether a dependent station participating in the second network exists when said detection unit of the third communication device detects said second communication device working as the dependent control station, is configured to request said second communication device to participate in the dependent network as a dependent control station of an other dependent network dependant on the dependent network if the confirmation results in that a dependent station participating in the second network exists, and is configured to request said second communication station to participate in the dependent network as a dependent station of the dependent network if the confirmation results in that a dependent station participating in the second network does not exists.

2. The communication system according to claim 1, wherein said second communication station further comprises:

a transmitting unit which transmits a specific control signal to said third communication device so as to cause said third communication device to switch its operation to work as a dependent station or a dependent control station, after said first control unit switched said second communication station to a dependent control station.

3. The communication system according to claim 2, wherein said second control unit stops operation as a control station and switches said third communication device to a dependent station of said second communication device, when said third communication device receives said specific control signal from said second communication device and there is no dependent station under said third communication device's control.

4. The communication system according to claim 2, wherein said second control unit switches said third communication device to a dependent control station following said second communication device, when said third communication device receives said specific control signal from said second communication device and there is a dependent station under said third communication device's control.

5. The communication system according to claim 1, wherein said second communication device further comprises:

a transmitting unit which transmits a request for depending to said first communication device when said switching unit switches said second communication device to a dependent control station.

* * * * *